(12) United States Patent
Savulak et al.

(10) Patent No.: US 9,590,497 B2
(45) Date of Patent: Mar. 7, 2017

(54) SYSTEMS AND METHODS FOR CAPACITOR CHARGE EXTRACTION

(71) Applicant: Rosemount Aerospace Inc., Burnsville, MN (US)

(72) Inventors: Stephen Savulak, Woodbury, CT (US); William A. Veronesi, Hartford, CT (US)

(73) Assignee: Rosemount Aerospace Inc., Burnsville, MN (US)

( * ) Notice: Subject to any disclaimer, the term of this patent is extended or adjusted under 35 U.S.C. 154(b) by 142 days.

(21) Appl. No.: 14/514,174

(22) Filed: Oct. 14, 2014

(65) Prior Publication Data

US 2016/0105098 A1    Apr. 14, 2016

(51) Int. Cl.

| H02M 3/04 | (2006.01) |
|---|---|
| H02M 3/155 | (2006.01) |
| H02J 1/12 | (2006.01) |
| H02J 7/00 | (2006.01) |
| H02J 7/34 | (2006.01) |

(52) U.S. Cl.
CPC ............... *H02M 3/04* (2013.01); *H02J 1/12* (2013.01); *H02J 7/0068* (2013.01); *H02J 7/345* (2013.01); *H02M 3/155* (2013.01)

(58) Field of Classification Search
CPC . H02M 3/04; H02M 3/155; H02M 2001/0083
See application file for complete search history.

(56) References Cited

U.S. PATENT DOCUMENTS

| 7,750,606 | B2 | 7/2010 | Rusan et al. |
| 8,242,633 | B2* | 8/2012 | Huang ............... G11C 16/22 |
| | | | 307/109 |
| 2004/0062059 | A1* | 4/2004 | Cheng ............... B60L 11/1814 |
| | | | 363/17 |

(Continued)

FOREIGN PATENT DOCUMENTS

| CN | 101188361 A | 5/2008 |
| CN | 102931653 A | 2/2013 |

(Continued)

OTHER PUBLICATIONS

Extended European Search Report Application No. 15189544.8-1804 dated Feb. 17, 2016.

(Continued)

*Primary Examiner* — Timothy J Dole
*Assistant Examiner* — Yusef Ahmed
(74) *Attorney, Agent, or Firm* — Locke Lord LLP; Scott D. Wofsy; Joshua L. Jones

(57) ABSTRACT

A system for providing electrical power to a load includes a boost converter with an input and an output. The boost converter is configured to receive power at a first voltage at the input, and to supply power at a higher second voltage from the output. A capacitor, e.g., a super capacitor, is operatively connected between the output of the boost converter and a ground node. A first switch is operatively connected between the first input node and the output of the boost converter for switching between a first state connecting the capacitor to the output of the boost converter and a second state connecting the capacitor to supply input voltage to the input of the boost converter.

11 Claims, 5 Drawing Sheets

(56) References Cited

U.S. PATENT DOCUMENTS

| | | | |
|---|---|---|---|
| 2004/0090806 A1* | 5/2004 | Yoshida | H02M 3/156 363/60 |
| 2004/0100149 A1* | 5/2004 | Lai | H02J 9/062 307/82 |
| 2005/0252546 A1 | 11/2005 | Sasaki | |
| 2007/0279141 A1 | 12/2007 | Chui | |
| 2008/0210286 A1 | 9/2008 | Ball | |
| 2008/0236648 A1 | 10/2008 | Klein et al. | |
| 2009/0039826 A1 | 2/2009 | Yeh et al. | |
| 2011/0199057 A1* | 8/2011 | Ivanov | H02J 7/0029 320/162 |
| 2012/0025752 A1* | 2/2012 | Teggatz | H02J 7/35 320/101 |
| 2012/0229110 A1* | 9/2012 | Huang | H02M 3/1582 323/282 |
| 2013/0002045 A1* | 1/2013 | Hassan-Ali | H01L 31/02021 307/130 |
| 2013/0264870 A1* | 10/2013 | Keysar | H02J 1/00 307/24 |
| 2013/0320954 A1* | 12/2013 | Capofreddi | H02M 3/1582 323/311 |
| 2015/0042300 A1* | 2/2015 | Peker | H02M 3/156 323/274 |
| 2015/0214835 A1* | 7/2015 | Shao | H02M 3/158 323/234 |
| 2015/0256062 A1* | 9/2015 | Shirahata | H02M 3/04 323/304 |

FOREIGN PATENT DOCUMENTS

| | | |
|---|---|---|
| JP | 2004297992 A | 10/2004 |
| KR | 20110073635 A | 6/2011 |
| TW | 200812188 A | 3/2008 |
| TW | 200812190 A | 3/2008 |

OTHER PUBLICATIONS

Thounthong: Comparative Study of Fuel-Cell Vehicle Hybridization with Battery or Supercapacitor Storage Device. Thounthong, P. et al. vol. 58. No. 8; 2009.

* cited by examiner

SYSTEMS AND METHODS FOR CAPACITOR CHARGE EXTRACTION

BACKGROUND OF THE INVENTION

1. Field of the Invention

The present disclosure relates to power supply systems, and more particularly to extracting charges from super capacitors as in energy harvesting applications.

2. Description of Related Art

Typical energy harvesting systems include a low voltage energy harvester, such as an inertial generator, thermoelectric generator, or solar panel, a boost converter for raising the low voltage from the energy harvester to a nominal level for a specific load, and an energy storage device such as a battery, super capacitor, or the like. The harvester supplies low voltage power to the boost converter, which raises the voltage to within an acceptable input voltage range for the load. When using a super capacitor, for example, a first plate of the super capacitor is connected between the boost converter and load, and the second plate is connected to ground. In this position, the super capacitor can accumulate energy when the output voltage of the boost converter is high, and can discharge energy to the load when the boost converter output voltage drops off, as when the harvester is not producing energy. This system helps maintain the input voltage to the load within an acceptable range despite the fact that the energy production of the harvester may be highly variable over time.

Such conventional methods and systems have generally been considered satisfactory for their intended purpose. However, there is still a need in the art for improved management of power from energy harvesters and the like. The present disclosure provides a solution for this need.

SUMMARY OF THE INVENTION

A system for providing electrical power to a load includes a boost converter with an input and an output. The boost converter is configured to receive power at a first voltage at the input, and to supply power at a higher second voltage from the output. A capacitor, e.g., a super capacitor, is operatively connected between the output of the boost converter and a ground node. A first switch is operatively connected between the first input node and the output of the boost converter for switching between a first state connecting the capacitor to the output of the boost converter and a second state connecting the capacitor to supply input voltage to the input of the boost converter.

A charge decision controller can be operatively connected to a first input node to detect voltage of the capacitor. The charge decision controller can be operatively connected to detect voltage at a second input node selectively connected to the input of the boost converter. A second switch can be operatively connected between the second input node and the input of the boost converter for switching between a first state connecting the boost converter to the second input node to receive power from a power source, and a second state disconnecting the boost converter from the second input node. The charge decision controller is configured to command the first and second switches into their respective second states upon detection of voltage below a first predetermined limit at the second input node and voltage of the capacitor below a second predetermined limit.

The charge decision controller can be configured to command the first and second switches into their respective first states upon detection of voltage above the first predetermined limit at the second input node and/or voltage of the capacitor above the second predetermined limit. The system can include a charge network operatively connected between the output of the boost converter and the first switch, wherein the first switch includes a third state for connecting the capacitor to a charge network to avoid allowing the capacitor to draw power needed for a load connected to the output of the boost converter when charging the capacitor. The first and second switches can be electrically connected to one another to provide an electrical connection from the capacitor to power the boost converter in the second state of the first and second switches. A power source can be operatively connected to the second input node, e.g., wherein the power source includes an energy harvester.

A method of supplying power includes supplying power to a load in a first state of a power supply system. The first state includes powering a load from a power source connected to an input of a boost converter, wherein the output of the boost converter is connected to the load to raise the voltage from the power source to above a minimum acceptable level for the load; charging a capacitor, e.g., a super capacitor, connected between the output of the boost converter and a ground node when the output voltage of the boost converter is higher than the voltage of the capacitor; and powering the load from the capacitor when the voltage of the capacitor is higher than the output voltage of the boost converter. The method also includes switching to a second state of the power supply system to supply power to the load when power from the power source is insufficient and the voltage of the capacitor is below the minimum acceptable level for the load, wherein switching to the second state includes: disconnecting the power source from the boost converter; and connecting the capacitor to the input of the boost capacitor to supply power to the load from the capacitor.

The method can include switching from the second state to the first state when sufficient power becomes available from the power source. It is also contemplated that the method can include sensing voltages of the power source and capacitor, wherein switching from the first state to the second state and switching from the second state to the first state includes switching based on the voltages sensed. It is further contemplated that switching from the second state to the first state can include connecting the capacitor to a charge network before connecting the capacitor to the output of the boost converter in the event that the capacitor voltage is below a predetermined threshold at the time of switching to the first state in order to avoid starving the load when connecting the capacitor to the output of the boost converter.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 2:
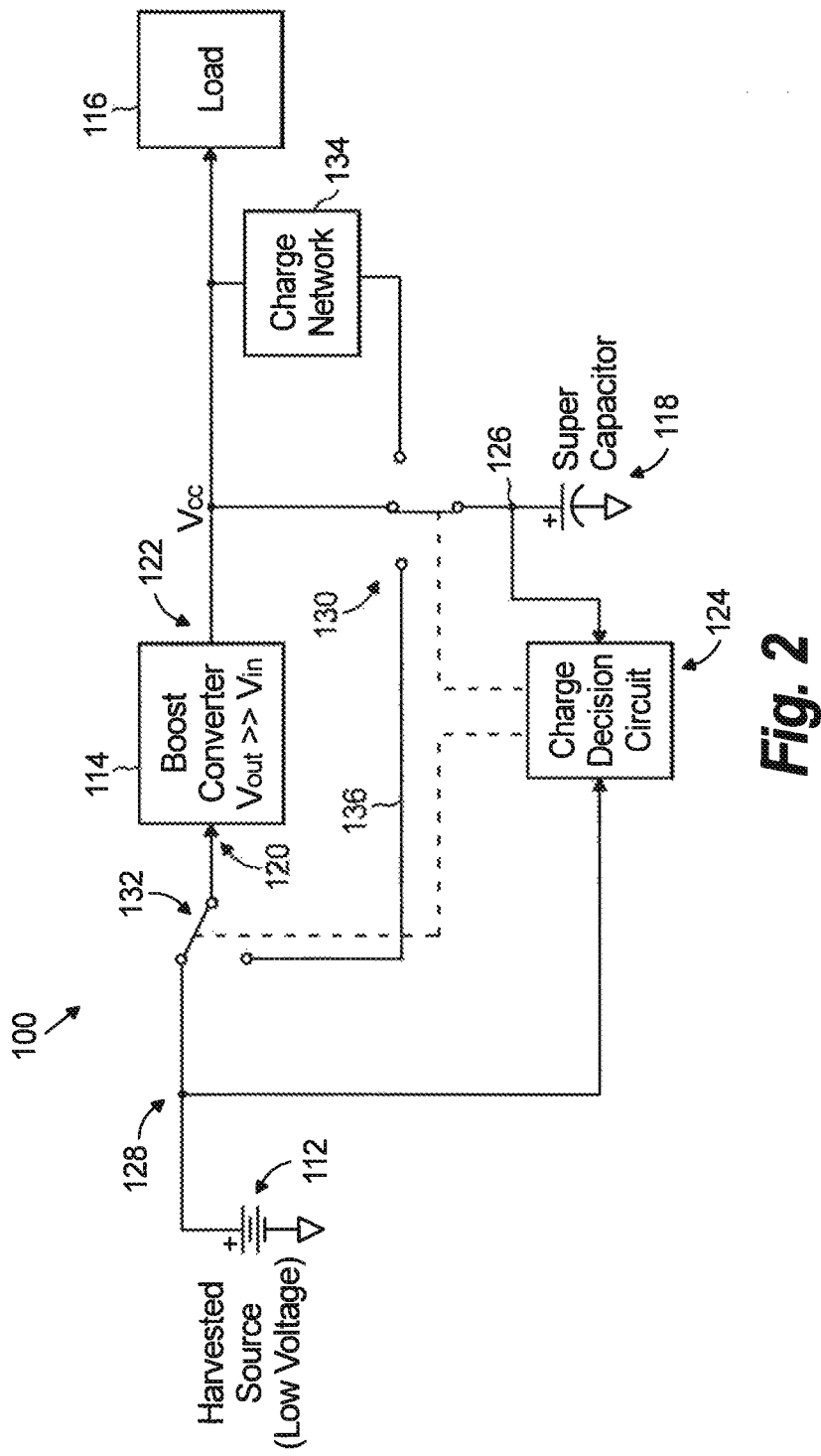
FIG. 2 is a schematic view of an exemplary embodiment of a system for providing electrical power constructed in accordance with the present disclosure, showing the system in a first state supplying power from a harvested source through a boost converter, charging or drawing from the super capacitor as needed.

Reference will now be made to the drawings wherein like reference numerals identify similar structural features or aspects of the subject disclosure. For purposes of explanation and illustration, and not limitation, a partial view of an exemplary embodiment of a system in accordance with the disclosure is shown in FIG. 2 and is designated generally by reference character 100. Other embodiments of systems in accordance with the disclosure, or aspects thereof, are provided in FIGS. 3-5, as will be described. The systems and methods described herein can be used to provide power to loads with improved capacitor utilization.

Figure 1:
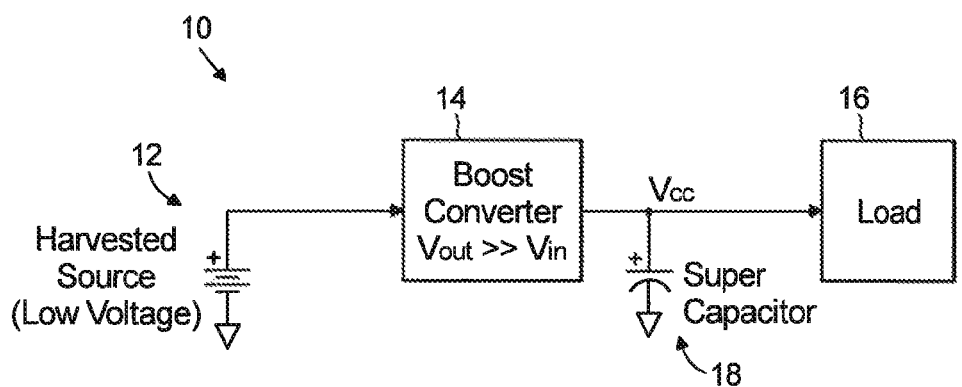
FIG. 1 is a schematic view of a prior art system for providing electrical power, showing a harvested source, boost converter, and super capacitor.

Referring first to FIG. 1, a typical energy harvesting system 10 includes a low voltage energy harvester 12, such as an inertial generator or solar panel, a boost converter 14 for raising the low voltage from the energy harvester 12 to a nominal level for a specific load 16, and an energy storage device such as a battery, super capacitor 18, or the like. The harvester 12 supplies low voltage power to the boost converter 14, which raises the voltage to within an acceptable input voltage range for the load 16. When using a super capacitor, for example, a first plate of the super capacitor 18 is connected between the boost converter and load 16, and the second plate is connected to ground. In this position, the super capacitor 18 can accumulate energy when the output voltage of the boost converter 14 is high, and can discharge energy to the load 16 when the boost converter 14 output voltage drops off, as when the harvester 12 is not producing energy. This system helps maintain the input voltage to the load 16 within an acceptable range despite the fact that the energy production of the harvester 12 may be highly variable over time.

While system 10 of FIG. 1, e.g., a traditional energy harvesting circuit, does a good job of extracting the low voltage energy of the source, and provides a backup source of energy with the super capacitor 18, a typical low power electrical load will not effectively use all the energy stored during the super capacitor charge phase. For example, with a typical 3.3V load circuit, many analog integrated circuits will cease to function at about 2.3V and numerous high performance microcontrollers lose I/O functionality at 3.15V. With a fixed capacitance value of the super capacitor 18, this is the equivalent of only using about 51% and 9%, respectively, of the total stored energy. If the super capacitor can be discharged down to 0.2V, for example using the systems and methods disclosed herein, the lower input range of typical energy harvesting boost converters, nearly 100% of the stored energy in a super capacitor can be utilized.

With reference now to FIG. 2, a system 100 for providing electrical power to a load 116 in accordance with the present disclosure includes a boost converter 114 with an input 120 and an output 122. The boost converter 114 is configured to receive power at a first voltage at the input, and to supply power at a higher second voltage from the output. A capacitor 118, e.g., a super capacitor, is operatively connected between the output 122 of the boost converter 114 and a ground node. A charge decision controller 124 is operatively connected to a first input node 126 to detect voltage of the capacitor 118 and is operatively connected to detect voltage at a second input node 128 selectively connected to the input 120 of the boost converter 114. A first switch 130 is operatively connected between the first input node 126 and the output 122 of the boost converter 114 for switching between a first state, shown in FIG. 2, connecting the capacitor 118 to the output 122 of the boost converter and a second state, shown in FIG. 3 connecting the capacitor 118 to supply input voltage to the input 120 of the boost converter 114.

Figure 3:
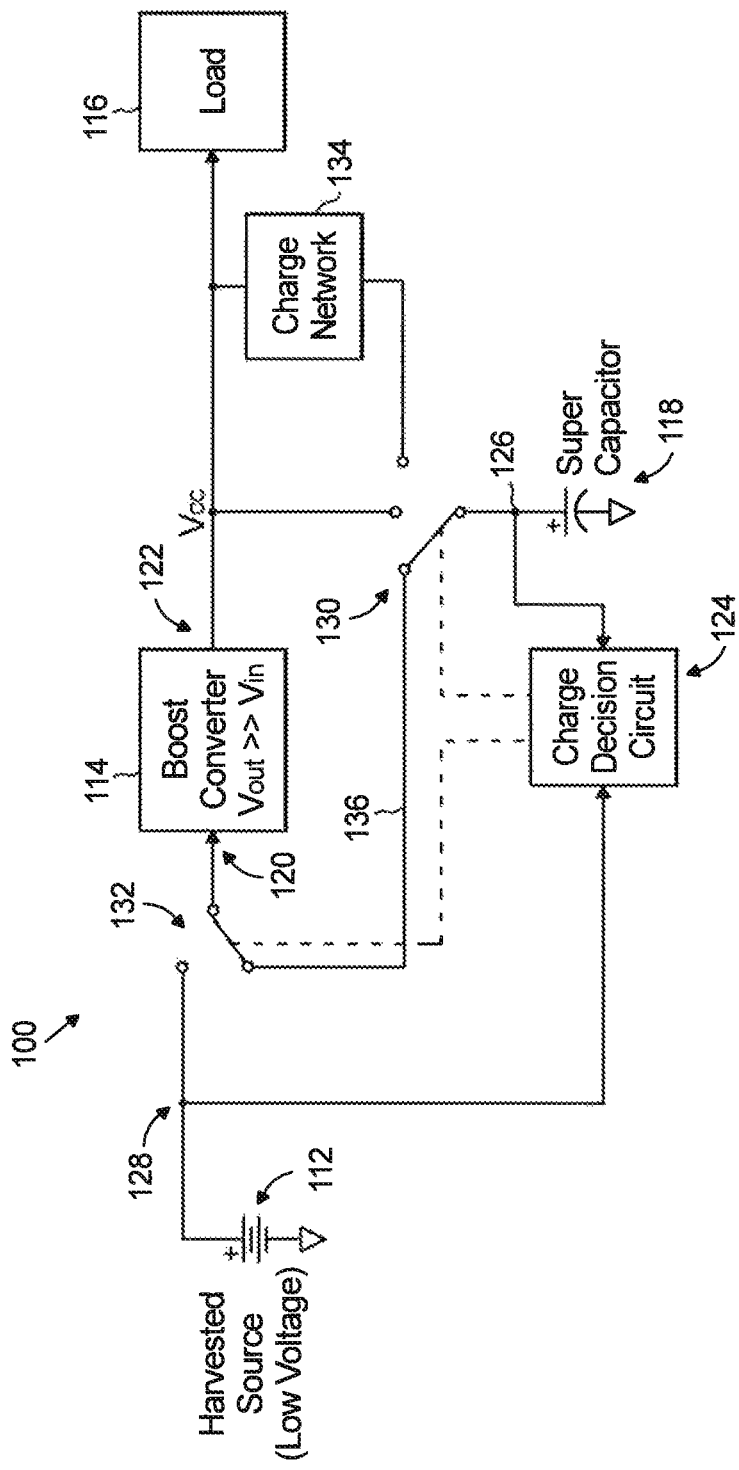
FIG. 3 is a schematic view of the system of FIG. 2, showing a second state wherein the super capacitor powers the boost converter to supply power to the load.

A second switch 132 is operatively connected between the second input node 128 and the input 120 of the boost converter 114 for switching between a first state, shown in FIG. 2, connecting the boost converter 114 to the second input node 128 to receive power from a power source, e.g., a harvested power source 112, and a second state, shown in FIG. 3, disconnecting the boost converter 114 from the second input node 128. The charge decision controller 124 is configured to command the first and second switches 130 and 132 into their respective second states upon detection of voltage below a first predetermined limit K at the second input node 128 and voltage of the capacitor 118, i.e., at the first input node 126 below a second predetermined limit L. The charge decision controller 124 is configured to command the first and second switches 130 and 132 into their respective first states upon detection of voltage above the first predetermined limit K at the second input node 128 and/or voltage of the capacitor 118 above the second predetermined limit L.

Figure 4:
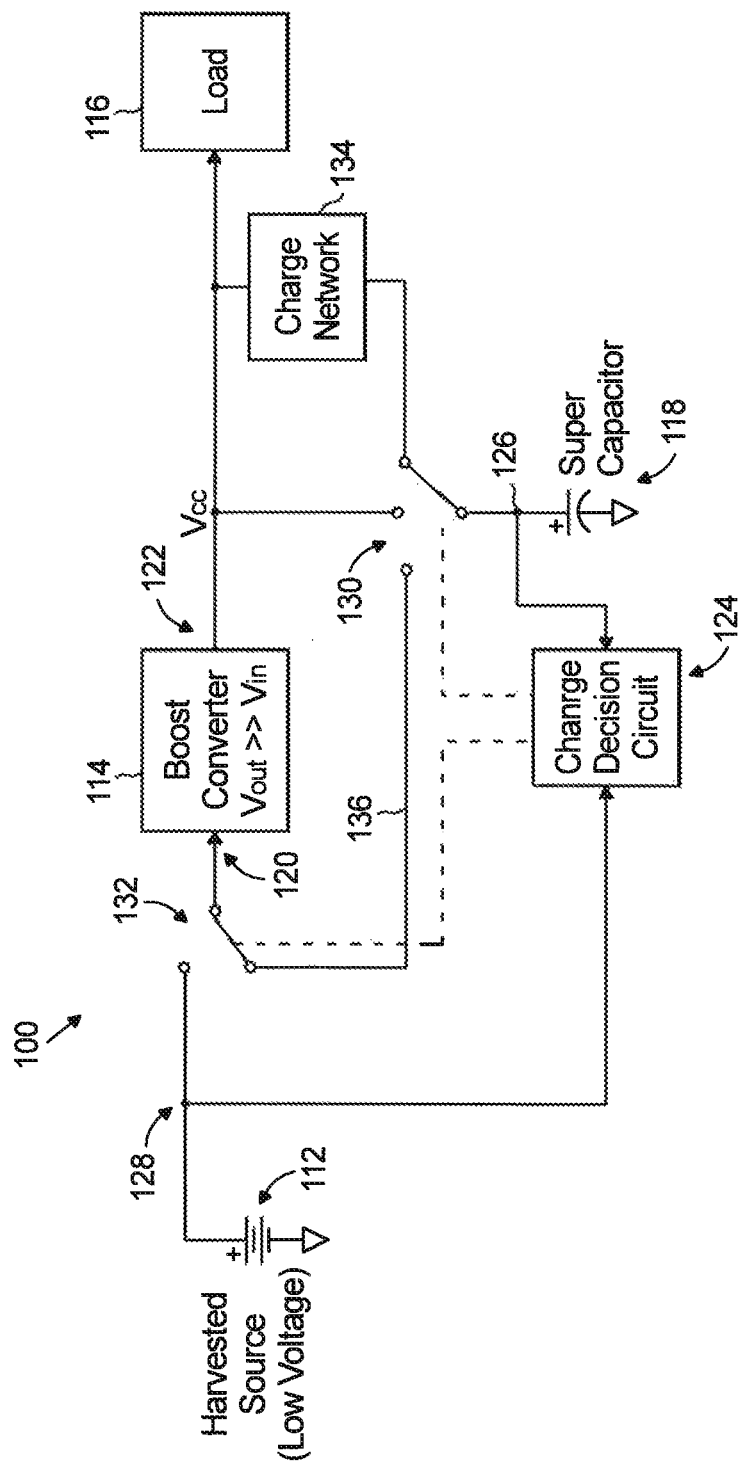
FIG. 4 is a schematic view of the system of FIG. 2, showing a third state wherein the super capacitor connects through a charge network to avoid starving the load before returning to the first state shown in FIG. 2.

System 100 includes a charge network 134 operatively connected between the output 122 of the boost converter 114 and the first switch 130. The first switch 130 includes a third state, as shown in FIG. 4, for connecting the capacitor 118 to charge network 134 configured to avoid allowing the capacitor 118 to draw power needed for the load 116 connected to the output 122 of the boost converter 114 when charging the capacitor 118. For example, if the charge on capacitor 118 is low enough to starve load 116 if they are both connected directly to output 122, charge network 134 will allow capacitor 118 to charge without starving load 116. The first and second switches 130 and 132 can be electrically connected to one another, via line 136, to provide an electrical connection from the capacitor 118 to power the boost converter 114 in the second state of the first and second switches 130 and 132.

Figure 5:
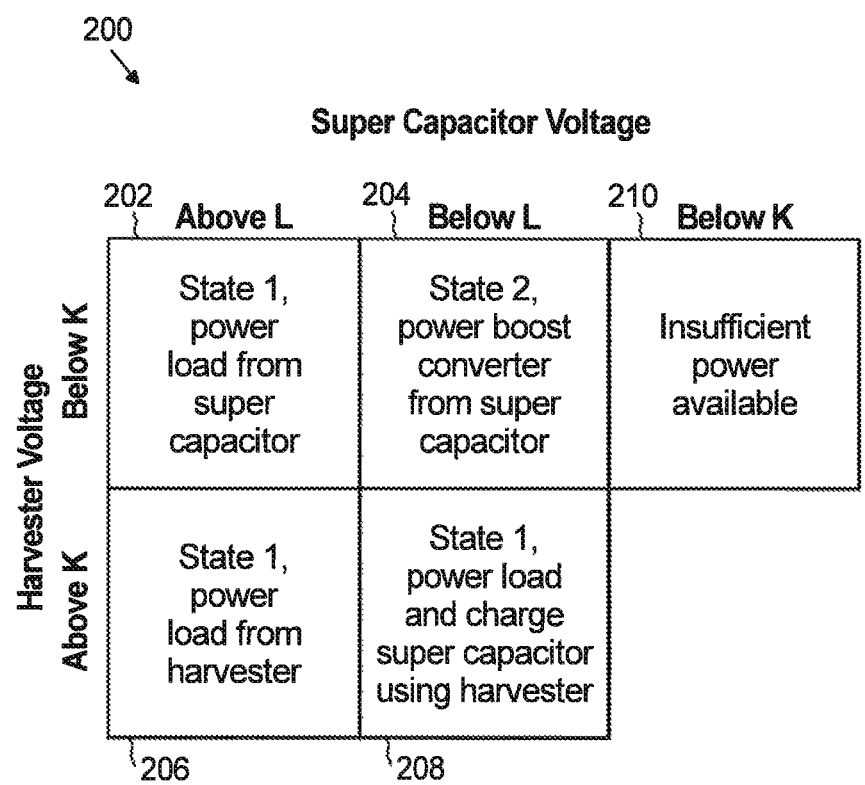
FIG. 5 is a block diagram showing different conditions of the systems based on voltage of the super capacitor and harvested source.

With reference now to FIG. 5, a method of supplying power is described. The method includes supplying power to a load, e.g. load 116, in a first state of a power supply system, e.g., system 100. The first state includes powering the load from a power source, e.g., power source 112, connected to an input of a boost converter, e.g., boost converter 114, wherein the output of the boost converter is connected to the load to raise the voltage from the power source to above a minimum acceptable level for the load; charging a capacitor, e.g., capacitor 118, connected between the output of the boost converter and a ground node when the output voltage of the boost converter is higher than the voltage of the capacitor; and powering the load from the capacitor when the voltage of the capacitor is higher than the output voltage of the boost converter. The method also includes switching to a second state, indicated by box 204 in FIG. 5, of the power supply system to supply power to the load when power from the power source is insufficient, e.g., below the first predetermined limit K, and the voltage of the capacitor is below the minimum acceptable level for the load, e.g., the capacitor voltage is below the second predetermined limit L. Switching to the second state includes: disconnecting the power source from the boost converter; and connecting the capacitor to the input of the boost capacitor to supply power to the load from the capacitor.

The method can include switching from the second state, e.g. box 204, to the first state when sufficient power becomes available from the power source. It is also contemplated that the method can include sensing voltages of the power source and capacitor, wherein switching from the first state to the second state and switching from the second state to the first state includes switching based on the voltages sensed. It is further contemplated that switching from the second state to the first state can include connecting the capacitor to a charge network, e.g., charge network 134, before connecting the capacitor to the output of the boost converter in the event that the capacitor voltage is below a predetermined threshold L, as indicated by box 208 in FIG. 5, at the time of switching to the first state in order to avoid starving the load when connecting the capacitor to the output of the boost converter. Once the charge decision circuit determines that the capacitor will not overload the boost converter, it returns the system to the first state, e.g., as shown in FIG. 2. Boxes 202 and 206 in FIG. 5 denote normal operation in state 1, wherein the load is powered by the capacitor and by the power source, respectively. Box 210 in FIG. 5 represents a state where there is insufficient power from the power source, e.g., power source 112, and from the capacitor to power the load. To avoid ever reaching this state, design choices can be made to provide sufficient power to a given load by ensuring enough power is available at all times from the power source and capacitor.

The systems and methods described herein provide enhanced utilization of energy stored in the capacitor compared to traditional systems. The difference between the first predetermined voltage K and the second predetermined voltage L represents voltage in the capacitor that traditional systems would not be able to utilize, but which systems and methods disclosed herein can utilize. While described herein in the exemplary context of capacitors and super capacitors, those skilled in the art will readily appreciate that any suitable power storage device can be used. For example, batteries can be used in addition to or in lieu of capacitors or super capacitors as described herein. A practical limitation is that many existing battery chemistries will exhibit reduced lifetimes if they are often discharged to nearly zero volts. While described herein in the exemplary context of energy harvesters, those skilled in the art will readily appreciate that any other suitable power source can be used.

The methods and systems of the present disclosure, as described above and shown in the drawings, provide for systems and methods of providing power, e.g., from harvested sources, with superior properties including improved capacitor utilization. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A system for providing electrical power to a load comprising:
   a boost converter with an input and an output;
   a storage device operatively connected between the output of the boost converter and a ground node, wherein the energy storage device is a super capacitor;
   a first switch operatively connected between a first input node and the output of the boost converter, the switch having a first state connecting the energy storage device to the output of the boost converter and a second state connecting the energy storage device to supply input voltage to the input of the boost converter;
   a charge decision controller operatively connected to the first input node to detect voltage of the energy storage device, wherein the charge decision controller is operatively connected to detect voltage at a second input node selectively connected to the input of the boost converter;
   a second switch operatively connected between the second input node and the input of the boost converter, the second switch having a first state connecting the boost converter to the second input node to receive power from a power source, and a second state disconnecting the boost converter from the second input node, wherein the charge decision controller is operatively connected to command the first and second switches into their respective second states upon detection of voltage below a first predetermined limit at the input node and voltage of the capacitor below a second predetermined limit.

2. The system as recited in claim 1, wherein the charge decision controller is operatively connected to command the first and second switches into their respective first states upon detection of voltage above the first predetermined limit at the input node and/or voltage of the capacitor above the second predetermined limit.

3. The system as recited in claim 1, further comprising a charge network operatively connected between the output of the boost converter and the first switch, wherein the first switch includes a third state connecting the capacitor to the charge network to avoid allowing the capacitor to draw power needed for a load connected to the output of the boost converter when charging the capacitor.

4. The system as recited in claim 1, wherein the first and second switches are electrically connected to one another to provide an electrical connection from the capacitor to power the boost converter in the second state of the first and second switches.

5. The system as recited in claim 1, further comprising the power source operatively connected to the second input node.

6. The system as recited in claim 5, wherein the power source includes an energy harvester.

7. A method of supplying power comprising:
   supplying power to a load in a first state of a power supply system, wherein the first state includes:
      powering the load from a power source connected to an input of a boost converter, wherein the output of the boost converter is connected to the load to raise the voltage from the power source to above a minimum acceptable level for the load;
      charging a storage device connected between the output of the boost converter and a ground node when the output voltage of the boost converter is higher than the voltage of the storage device; and powering the load from the storage device when the voltage of the storage device is higher than the output voltage of the boost converter; and switching to a second state of the power supply system to supply power to the load when power from the power source is insufficient and the voltage of the storage device is below the minimum acceptable level for the load, wherein switching to the second state includes:

disconnecting the power source from the boost converter; and connecting the storage device to the input of the boost converter to supply power to the load from the storage device.

8. The method as recited in claim 7, wherein the storage device is a super capacitor.

9. The method as recited in claim 8, further comprising switching from the second state to the first state when sufficient power becomes available from the power source.

10. The method as recited in claim 9, further comprising sensing voltages of the power source and capacitor, wherein switching from the first state to the second state and switching from the second state to the first state includes switching based on the voltages sensed.

11. The method as recited in claim 8, wherein switching from the second state to the first state includes connecting the capacitor to a charge network before connecting the capacitor to the output of the boost converter in the event that the capacitor voltage is below a predetermined threshold at the time of switching to the first state in order to avoid starving the load when connecting the capacitor to the output of the boost converter.

* * * * *